United States Patent
Yasukochi

(10) Patent No.: US 11,267,168 B2
(45) Date of Patent: Mar. 8, 2022

(54) STRUCTURE FORMING APPARATUS, STRUCTURE MANUFACTURING METHOD, AND STRUCTURE

(71) Applicant: Sony Corporation, Tokyo (JP)

(72) Inventor: Hiroyuki Yasukochi, Kanagawa (JP)

(73) Assignee: Sony Corporation, Tokyo (JP)

( * ) Notice: Subject to any disclaimer, the term of this patent is extended or adjusted under 35 U.S.C. 154(b) by 795 days.

(21) Appl. No.: 13/849,949

(22) Filed: Mar. 25, 2013

(65) Prior Publication Data

US 2013/0260110 A1 Oct. 3, 2013

(30) Foreign Application Priority Data

Mar. 28, 2012 (JP) .............................. JP2012-073796

(51) Int. Cl.
  *B29C 35/08* (2006.01)
  *B29C 35/10* (2006.01)
  *B29C 37/00* (2006.01)

(52) U.S. Cl.
  CPC ...... *B29C 35/0805* (2013.01); *B29C 35/0894* (2013.01); *B29C 35/10* (2013.01); *B29C 37/0053* (2013.01); *B29C 2035/0827* (2013.01); *Y10T 428/24802* (2015.01)

(58) Field of Classification Search
  CPC combination set(s) only.
  See application file for complete search history.

(56) References Cited

U.S. PATENT DOCUMENTS

| | | | | |
|---|---|---|---|---|
| 3,316,826 A | * | 5/1967 | Port | G03B 27/16 355/110 |
| 3,479,120 A | * | 11/1969 | Davis | G03B 27/22 355/85 |
| 3,694,245 A | * | 9/1972 | Anderson et al. | B41N 1/245 101/128.21 |
| 4,029,459 A | * | 6/1977 | Schmiedeke | B30B 11/22 425/202 |
| 4,132,882 A | * | 1/1979 | Endo | G03G 15/2064 118/60 |
| 4,465,931 A | * | 8/1984 | Ohkubo | G03B 27/10 101/128.21 |
| 4,957,580 A | * | 9/1990 | Drexler | G06K 19/06046 156/250 |
| 2002/0158963 A1 | * | 10/2002 | Dietze | B41J 2/465 347/238 |
| 2004/0022050 A1 | * | 2/2004 | Yamashita | G02B 6/0021 362/615 |
| 2009/0130607 A1 | * | 5/2009 | Slafer | B82Y 10/00 430/323 |
| 2010/0155974 A1 | * | 6/2010 | Oliveira | G03F 7/2035 264/1.38 |

FOREIGN PATENT DOCUMENTS

| | | | |
|---|---|---|---|
| JP | H09149194 A | * | 6/1997 |
| JP | 2011-102039 | | 5/2011 |

* cited by examiner

*Primary Examiner* — Michael M. Robinson
(74) *Attorney, Agent, or Firm* — Chip Law Group

(57) ABSTRACT

A structure forming apparatus includes a rotary body, an irradiation unit, and a holding member. On the rotary body, a mask that is subjected to patterning is capable of being disposed. The irradiation unit is capable of irradiating an area along an axis direction of a rotation of the rotary body with an energy line with the mask intervened therebetween. The holding member is disposed to be opposed to the rotary body so that a holding area that holds a material cured with the energy line is formed.

14 Claims, 9 Drawing Sheets

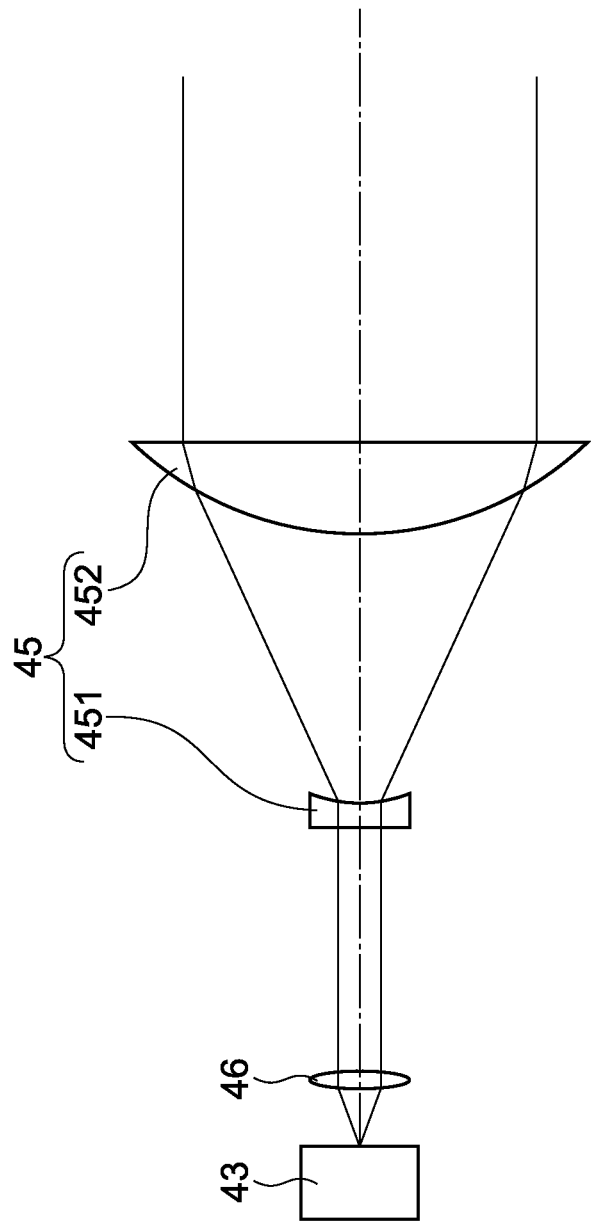
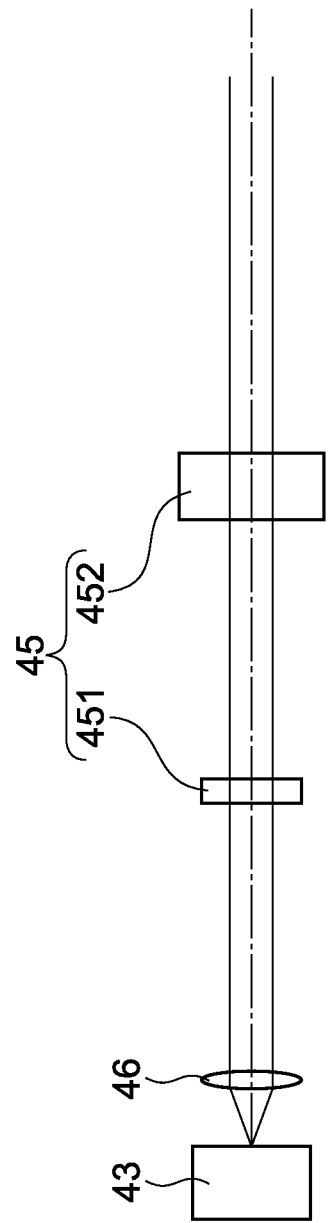
FIG.10A
FIG.10B

STRUCTURE FORMING APPARATUS, STRUCTURE MANUFACTURING METHOD, AND STRUCTURE

CROSS REFERENCES TO RELATED APPLICATIONS

The present application claims priority to Japanese Priority Patent Application JP 2012-073796 filed in the Japan Patent Office on Mar. 28, 2012, the entire content of which is hereby incorporated by reference.

BACKGROUND

The present disclosure relates to a structure forming apparatus that forms a sheet-shaped structure, a structure manufacturing method, and a structure manufactured by the structure forming apparatus and the structure manufacturing method.

A roller type imprint apparatus disclosed in Japanese Patent Application Laid-open No. 2011-102039 is an apparatus that forms a resin sheet by using a so-called nanoimprint technology. The apparatus is provided with a transfer roller for transferring a pattern on the resin sheet. On an outer circumferential surface of the transfer roller, a transfer pattern of a nanometer size is formed. As the resin sheet, UV curing resin provided on a base film is used. When the resin sheet passes on a surface of the transfer roller, the resin sheet is irradiated with UV rays, with the result that the pattern of the transfer roller is formed on the resin sheet (see, for example, paragraph 0085 in Japanese Patent Application Laid-open No. 2011-102039).

SUMMARY

In the apparatus disclosed in Japanese Patent Application Laid-open No. 2011-102039, the shape of the entire surface of the transfer pattern is transferred by a transfer roller having a curvature, and removing of the resin sheet from the transfer roller, that is, releasing is performed along with the rotation of the transfer roller. Therefore, the higher the aspect ratio of the pattern to be transferred is, the more difficult the releasing becomes, which may damage the pattern.

In view of the above-mentioned circumstances, it is desirable to provide a structure forming apparatus and a structure manufacturing method capable of forming a manufacture without damaging a pattern regardless of a pattern shape of a structure and provide a structure thus manufactured.

According to an embodiment of the present disclosure, there is provided a structure forming apparatus including a rotary body, a holding member, and an irradiation unit.

On the rotary body, a mask that is subjected to patterning is capable of being disposed.

The irradiation unit is capable of irradiating an area along an axis direction of a rotation of the rotary body with an energy line with the mask intervened therebetween.

The holding member is disposed to be opposed to the rotary body so that a holding area that holds a material cured with the energy line is formed.

In the present disclosure, by using not a three-dimensional mold but a two-dimensional mask, a material cured by irradiation with the energy line becomes easily peeled off the rotating rotary body. That is, it is possible to prevent a pattern formed by curing the material from being damaged unlike the case where a three-dimensional mold is used.

The rotary body has a curved outer circumferential surface to form the holding area between the holding member and the outer circumferential surface. With this structure, it is possible to form a fine structure with a high resolution.

The irradiation unit may include a light source that emits light as the energy line.

The irradiation unit may further include a slit member having a slit that forms a linear irradiation area on the holding area by causing the light emitted from the light source to pass therethrough. With this structure, it is possible to form a linear light irradiation area even by using a light source that emits incoherent light.

The light source may be a light source that emits laser light, and the irradiation unit may further include an optical system that linearly spreads the laser light emitted. Even when the laser light source is used as described above, it is possible to irradiate the linear irradiation area with laser light.

The rotary body may be a tubular body having a hollow portion in which the light source is disposed. The light source is disposed in the hollow portion, which is the inside of the cylindrical body as the rotary body, so it is possible to achieve the downsizing of the structure forming apparatus.

The rotary body may have an outer circumferential surface on which the mask is disposed. With this structure, a distance between the mask and the holding member is reduced, so it is possible to increase a resolution of a pattern transfer.

On a surface of the holding member, at least an area where the holding area is formed may be a flat surface or a curved surface.

The structure forming apparatus may further include a traveling mechanism configured to cause a film-shaped base material that holds a structure formed by curing the material to travel. In this case, the holding member applies tension to the base material. As a result, it is possible to form a structure on the base material.

The structure forming apparatus may further include a winding reel configured to wind up a structure formed by curing the material. As a result, it is possible to wind up the structure by the winding reel.

In accordance with a distance between the rotary body and the holding member, a thickness of a structure to be formed may be determined. As a result, it is possible to set a thickness of the structure by adjusting the distance.

According to another embodiment of the present disclosure, there is provided a structure manufacturing method including holding a material that is cured by energy of an energy line between a rotary body on which a mask that is subjected to patterning is capable of being disposed and a holding member disposed to be opposed to the rotary body.

An area of the material held which is along an axis direction of a rotation of the rotary body is irradiated with the energy line through the mask.

According to another embodiment of the present disclosure, there is provided a structure manufactured by the method described above.

As described above, according to the present disclosure, it is possible to form the structure without damaging the pattern regardless of the pattern shape of the structure.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

BRIEF DESCRIPTION OF THE FIGURES

FIGS. 10A and 10B are a plan view and a side view of a light irradiation unit of a structure forming apparatus according to a third embodiment of the present disclosure, respectively.

DETAILED DESCRIPTION

Hereinafter, embodiments of the present disclosure will be described with reference to the drawings.

First Embodiment (Configuration of Structure Forming Apparatus)

Figure 1:
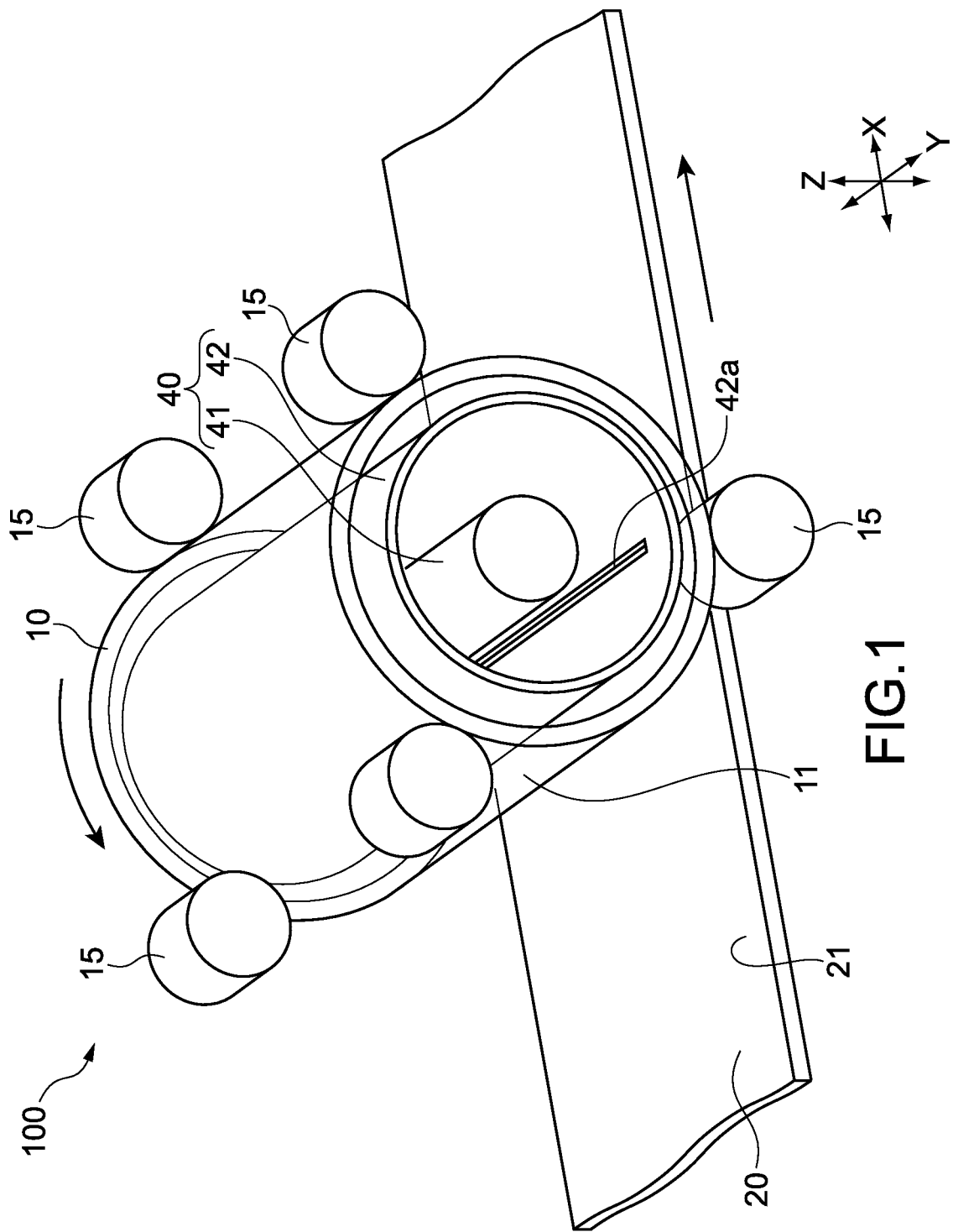
FIG. 1 is a perspective view schematically showing a structure forming apparatus according to a first embodiment of the present disclosure.
Figure 2:
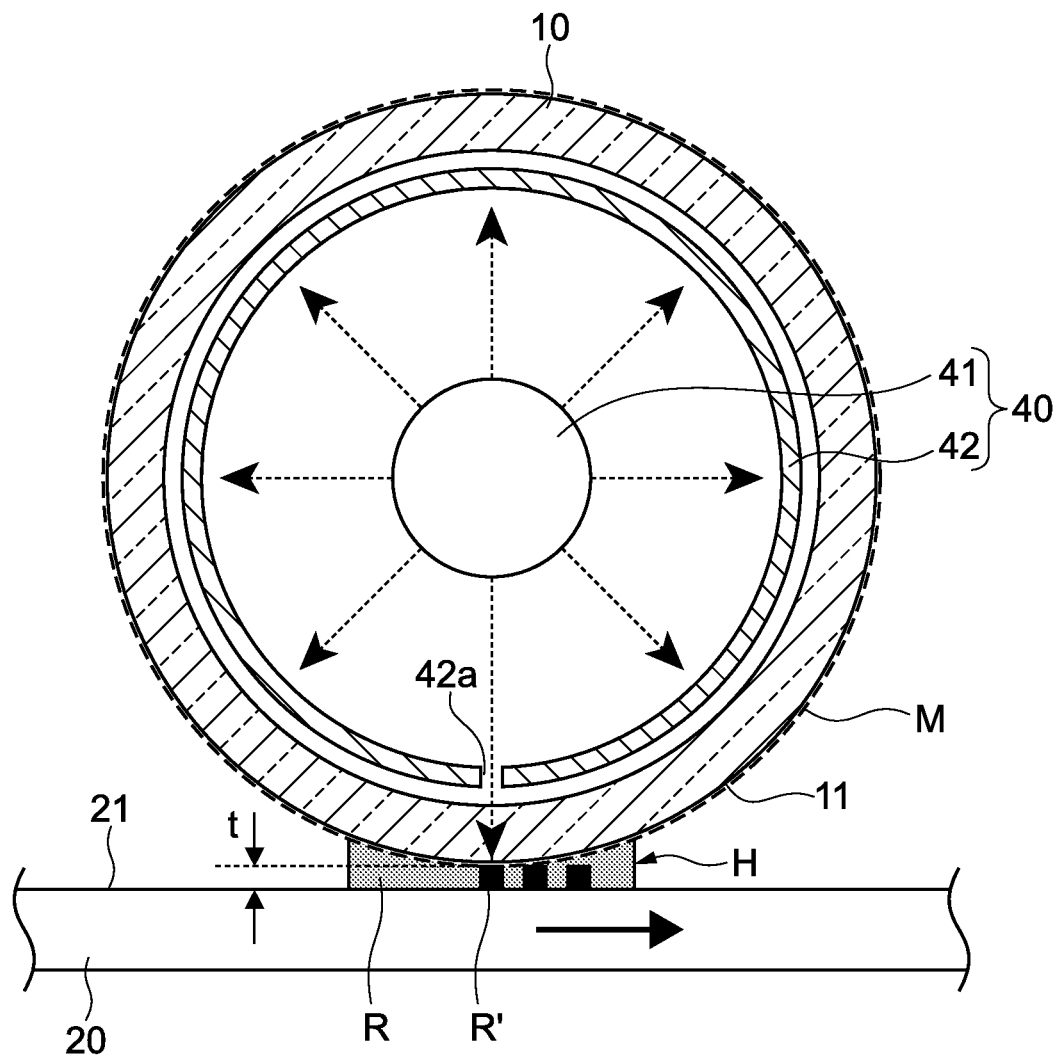
FIG. 2 is a side view showing the structure forming apparatus shown in FIG. 1.

FIG. 1 is a perspective view schematically showing a structure forming apparatus 100 according to a first embodiment of the present disclosure. FIG. 2 is a side view showing the structure forming apparatus 100 shown in FIG. 1.

The structure forming apparatus 100 is provided with a rotary drum 10 serving as a rotary body, a stage 20 serving as a holding member disposed so as to be opposed to the rotary drum 10, and a light irradiation unit 40 disposed in the rotary drum 10.

The rotary drum 10 has a length in a Y-axis direction, is formed into a tubular shape, typically, a tubular shape, and has an outer circumferential surface 11 having a cylindrical surface as a curved surface. To the outer circumferential surface 11, a plurality of rollers 15 are in contact, and the rotary drum 10 is held by the plurality of rollers 15. With this structure, the rotary drum 10 is rotatable with the Y-axis direction as an axis direction of the rotation.

The rotary drum 10 is made of a translucent material such as glass and acryl.

The stage 20 has a surface 21 opposed to the rotary drum 10. The surface 21 is formed into a planar shape. To the stage 20, a drive mechanism (not shown) that drives the stage 20 is connected. The drive mechanism has such a configuration that the stage 20 can be moved in, for example, a horizontal direction, in this case, in a direction (X-axis direction) perpendicular to the axis direction of the rotation of the rotary drum 10. As the drive mechanism, for example, a ball screw mechanism, a belt mechanism, a linear motor using an electromagnetic action, or the like is used.

As shown in FIG. 2, on the outer circumferential surface 11 of the rotary drum 10, a mask M having a light passing shape pattern (hereinafter, referred to as a translucent pattern) is disposed. That is, the mask M is disposed along the curved shape of the outer circumferential surface 11.

The mask M is made of metal, resin, or the like, formed into a shin film shape, and bonded on the outer circumferential surface 11 of the rotary drum 10. Typically, the mask M is provided over the entire circumference (360 degrees) of the outer circumferential surface 11. The mask M may be formed by photolithography, etching, cutting, or the like.

It should be noted that the translucent pattern of the mask M may be directly drawn on the outer circumferential surface 11 of the rotary drum 10 by printing or the like.

Figure 3:
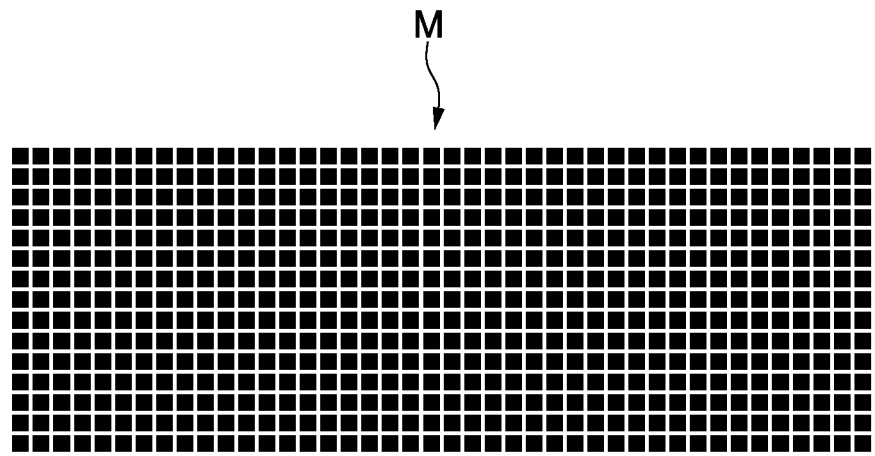
FIG. 3 is a plan view showing an example of a mask extended.

FIG. 3 is a plan view showing an example of the mask M extended. The black parts are light shielding parts, and the white part is a translucent part. In other words, the translucent pattern is a mesh form. The translucent pattern of the mask M is not limited to this and may have any shape pattern.

The light irradiation unit 40 has a UV lamp 41 that generates incoherent UV rays as a light source that emits light as an energy line. The UV lamp 41 is disposed substantially on the center of a hollow portion of the rotary drum 10 and has a long shape along the Y-axis direction.

Further, the light irradiation unit 40 has a slit member 42 disposed in the hollow portion of the rotary drum 10. The slit member 42 is not connected with the rotary drum 10 and is not rotated. The slit member 42 may be supported by a support member (not shown).

The slit member 42 has a slit 42a that is elongated along the Y-axis direction on a position opposed to the stage 20. Typically, the slit 42a is formed on a position (position in the slit member 42 in a radius direction which is the same as the outer circumferential surface 11) corresponding to an area of the outer circumferential surface 11 of the rotary drum 10, in which the distance between the outer circumferential surface 11 of the rotary drum 10 and the surface 21 of the stage 20 is the shortest.

The width of the slit 42a in the X-axis direction is approximately 0.1 to 1 mm but is not limited to this range. A distance t between the outer circumferential surface 11 of the rotary drum 10 and the surface 21 of the stage 20, which is the shortest as described above, is approximately 0.001 to 1 mm. In the case of this embodiment, the distance between the outer circumferential surface 11 of the rotary drum 10 and the surface 21 of the stage 20 corresponds to a thickness of a cured material R' (structure) formed by curing a liquid material R. That is, by adjusting the distance, it is possible to set the thickness of the structure to be formed.

The slit member 42 is formed of metal or resin. An inner circumferential surface of the slit member 42 is formed of a material having a high reflectance of light emitted from the UV lamp 41. The inner circumferential surface having the high reflectance may be formed by performing high reflectance coating on a base material of the slit member 42 or by forming the base material by a material having the high reflectance. With this structure, a quantity of light that passes through the slit 42a can be increased, and thus the use efficiency of light can be increased.

The UV lamp 41 emits light in a temporally continuous manner substantially. The meaning of "temporally continuous manner substantially" includes a form in which a light emission quantity from the UV lamp 41 is changed with a sufficiently shorter cycle than a rotation speed of the rotary drum 10 (moving speed of the stage 20). The sufficiently shorter cycle than the rotation speed of the rotary drum 10 means such a cycle that the material R receives a sufficient quantity of light through the translucent pattern of the mask M, and the material R obtains a predetermined hardness.

A maximum light irradiation possible range for a material held between the rotary drum 10 and the stage 20 by the light irradiation unit 40 is a size which is equal to or slightly larger than the slit 42a of the slit member 42. That is, the range is a linear irradiation area along the Y-axis direction.

The structure forming apparatus 100 is provided with a material supply unit (not shown) capable of supplying a liquid material. As shown in FIG. 2, the material supply unit supplies the material R to an area (holding area H for the material R) between the rotary drum 10 and the stage 20. Depending on materials that form the rotary drum 10 and the stage 20, shapes thereof, the state of the surface 21, a kind of the material, or the like, a predetermined amount of material R is held in the area between the rotary drum 10 and the stage 20.

As the liquid material R, a resin material which is cured by UV rays emitted from the UV lamp 41, that is, UV curing resin is used. Instead of the UV lamp 41, a lamp that emits visible light or infrared rays may be used, and depending on light used, a resin material can be selected as appropriate.

The material supply unit (not shown) has a nozzle having a slit or a plurality of holes and ejects the material from the slit or the plurality of holes.

It should be noted that the material supply unit may not be provided, and an operator may supply the material manually, for example.

(Operation of Structure Forming Apparatus)

The operation of the structure forming apparatus 100 will be described.

The material supply unit (not shown) supplies the material into the area between the rotary drum 10 and the stage 20. A supply amount or a supply flow of the material from the material supply unit is set as appropriate in accordance with the kind of the material, the material amount which can be held in the holding area H, a moving speed of a cured material (moving speed or the like of the rotary drum 10 and the stage 20).

When the material R is held in the holding area H, the stage 20 is moved at a constant speed, and light is emitted from the UV lamp 41. Through the slit 42a of the slit member 42, the rotary drum 10, and the translucent part of the mask M, the material R in the holding area H is irradiated with light.

A part of the material R which is irradiated with light is cured. A cured material R' has a function for linking the stage 20 and the rotary drum 10 with each other with a certain mechanical strength. As a result, along with the movement of the stage 20, the rotary drum 10 is rotated. Here, as will be described later, along with moving in the movement direction of the X-axis direction, the distance between the outer circumferential surface 11 of the rotary drum 10 and the surface 21 of the stage 20 is increased, the linking function is weakened by the cured material R'. As a result, the cured material is prevented from remaining bonded with the rotary drum 10.

As described above, the stage 20 and the rotary drum 10 are moved substantially at the constant speed, with the result that it is possible to form a sheet-shaped structure having a fine, highly accurate pattern shape.

As described above, to the structure formed on the stage 20, a cleaning liquid such as water or alcohol is supplied from a cleaning unit (cleaning nozzle) (not shown). As a result, the material R that is not cured and is adhered to the structure is removed. The cleaning may be manually performed by the operator.

Figure 4:
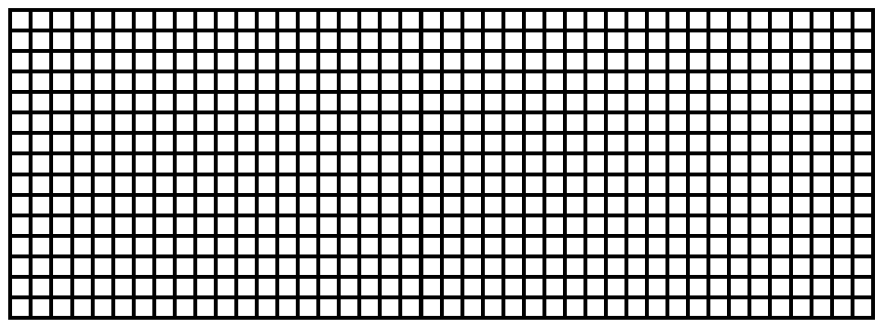
FIG. 4 is a plan view showing an example of a structure formed on the mask shown in FIG. 3.

For example, with the mask M as shown in FIG. 3, a mesh-shaped structure as shown in FIG. 4 is formed. The black part shown in FIG. 4 is a structure (cured material), and a rib having a thickness (height) t (see, FIG. 2) is formed.

As described above, in this embodiment, by using not a three-dimensional mold but the two-dimensional mask M, the cured material R' by the irradiation with light is easily released from the rotary drum 10 that rotates. That is, it is possible to prevent the pattern formed by curing the material from being damaged unlike the case where a three-dimensional mold is used in the imprint technology in related art.

That is, the higher aspect ratio the structure has, the more difficult the releasing of the structure from the three-dimensional mold becomes. However, according to this embodiment, such a problem can be overcome.

In particular, in this embodiment, a molding technology with the use of a one-dimensional restricted liquid surface method is used. That is, the molding technology with the use of the one-dimensional restricted liquid surface method is a technology in which a linear liquid surface along the Y-axis direction is restricted by the rotary drum 10, and the material R in the restricted area is irradiated with light.

The area that restricts the liquid surface of the material R and the curable area become the linear form along the Y axis and moves towards the movement direction in the X-axis direction. Along with this, the curved outer circumferential surface 11 of the rotary drum 10 is distanced from the surface 21 of the stage 20. With this structure, along with the movement of the stage 20, the cured material R' is easily released from the outer circumferential surface 11 of the rotary drum 10.

It should be noted that, to increase the linkage force of the stage 20 and the rotary drum 10 at the time when the rotary drum 10 is rotated therealong, a translucent part continuously formed in the Y-axis direction may be provided on one end portion or both end portions of the mask M in the X-axis direction. In this case, depending on the translucent part, a continuous cured portion of a material is formed, and a contact area of the cured portion and the outer circumferential surface 11 of the rotary drum 10 is increased, so the linkage force is increased.

Alternatively, the structure forming apparatus 100 may be further provided with a drive unit that rotates the rotary drum 10 in synchronization with the movement of the stage 20.

In this embodiment, the UV lamp 41 is disposed in the hollow portion of the rotary drum 10, so it is possible to downsize the structure forming apparatus 100.

In this embodiment, the mask M is disposed on the outer circumferential surface 11 of the rotary drum 10. With this structure, it is possible to shorten the distance t between the mask M and the surface 21 of the stage 20 as much as possible, which can increase a resolution of the transfer of the pattern.

In the above embodiment, the amount of hourly emitted light of the UV lamp 41 is set to be substantially constant. However, as shown in FIG. 3, in the case where the shape of the translucent pattern of the mask M is monotonous, the emitted light of the light irradiation unit 40 may be controlled as follows. That is, the control unit can turn on emission of light at a timing when the translucent unit faces the slit 42a (in the case of on and off) or control the amount of emitted light to be variable so that the light quantity is increased at the timing.

Figure 5:
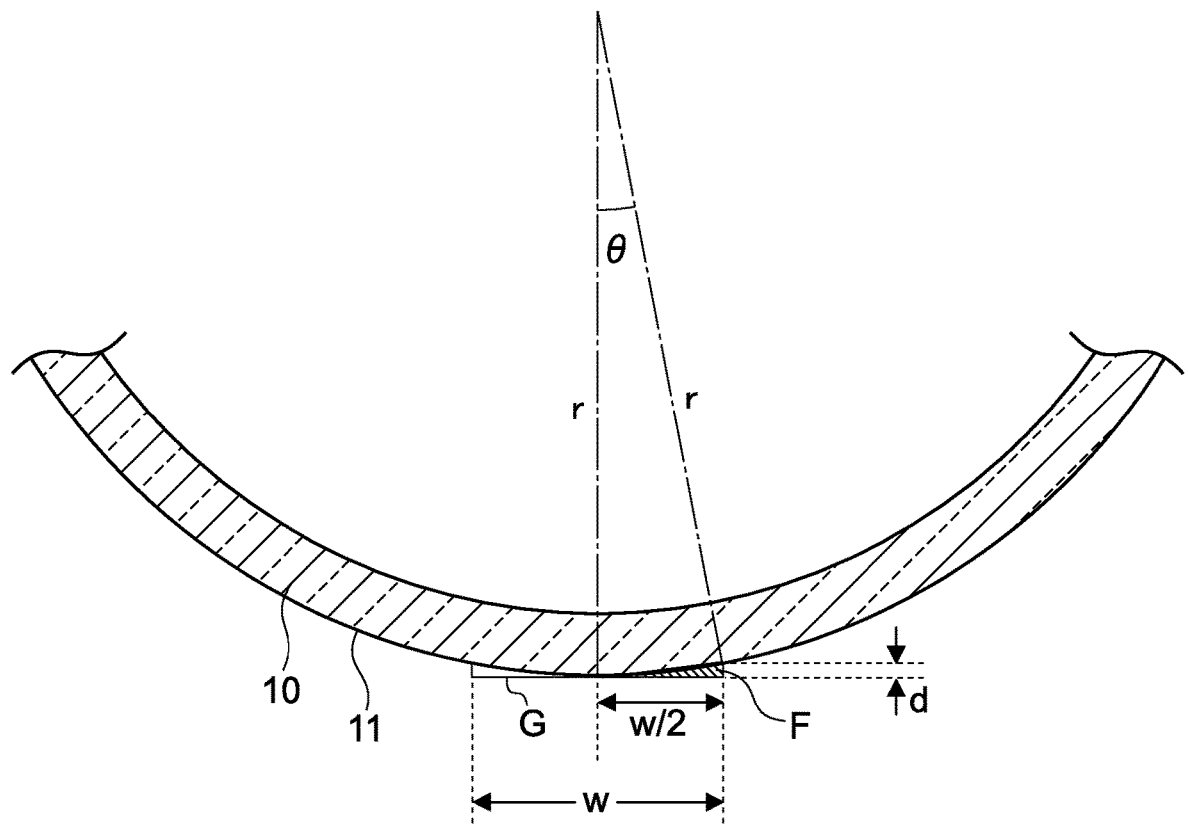
FIG. 5 is a diagram for explaining a displacement amount between an outer circumferential surface of a rotary drum and a plane of an irradiation area.

FIG. 5 is a diagram for explaining a displacement amount between the outer circumferential surface 11 of the rotary drum 10 and a plane of the light irradiation area.

A rotation radius and a width of light when viewed in the Y-axis direction in the holding area H are represented by r and w, respectively. In FIG. 5, to help understanding of the explanation, the size of the width of light is increased. A displacement amount (distance in a Z-axis direction from a plane G (having the width w) to the outer circumferential surface 11) in the Z-axis direction from the plane G of a part with which light is irradiated in the holding area H is represented by d.

In the case where an angle θ is micro, that is, $r \sin θ = rθ$ is established, when attention is focused on a micro approximate triangle F, the following two equations are established.

$$rθ = w/2$$

$$w/2 = d/\sin θ, \text{ that is, } w/2 = d/θ$$

From those equations, $d = w^2/(4r)$ is derived. For example, in the case of r=100 mm and w=1 mm, d=0.0025 mm is obtained. Therefore, the displacement amount d is a fairly minute value. In other words, the curved surface where light is incident on the outer circumferential surface 11 of the rotary drum 10 can be regarded as a substantially flat surface, and an incident width on the outer circumferential surface 11 is substantially the width w in the holding area.

Figure 6:
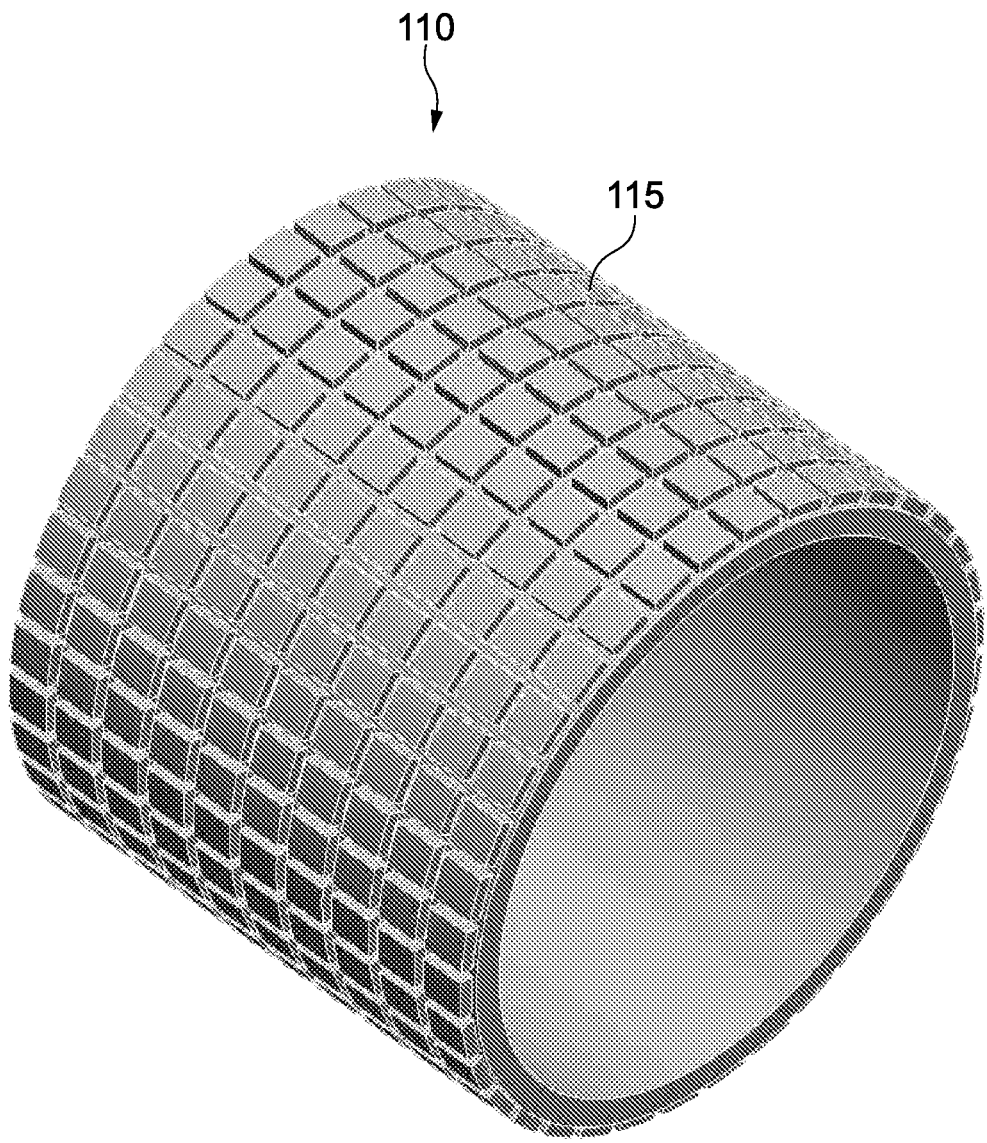
FIG. 6 is a perspective view showing a roller having a three-dimensional mold used in an imprint technology on a surface thereof as a reference example.
Figure 7:
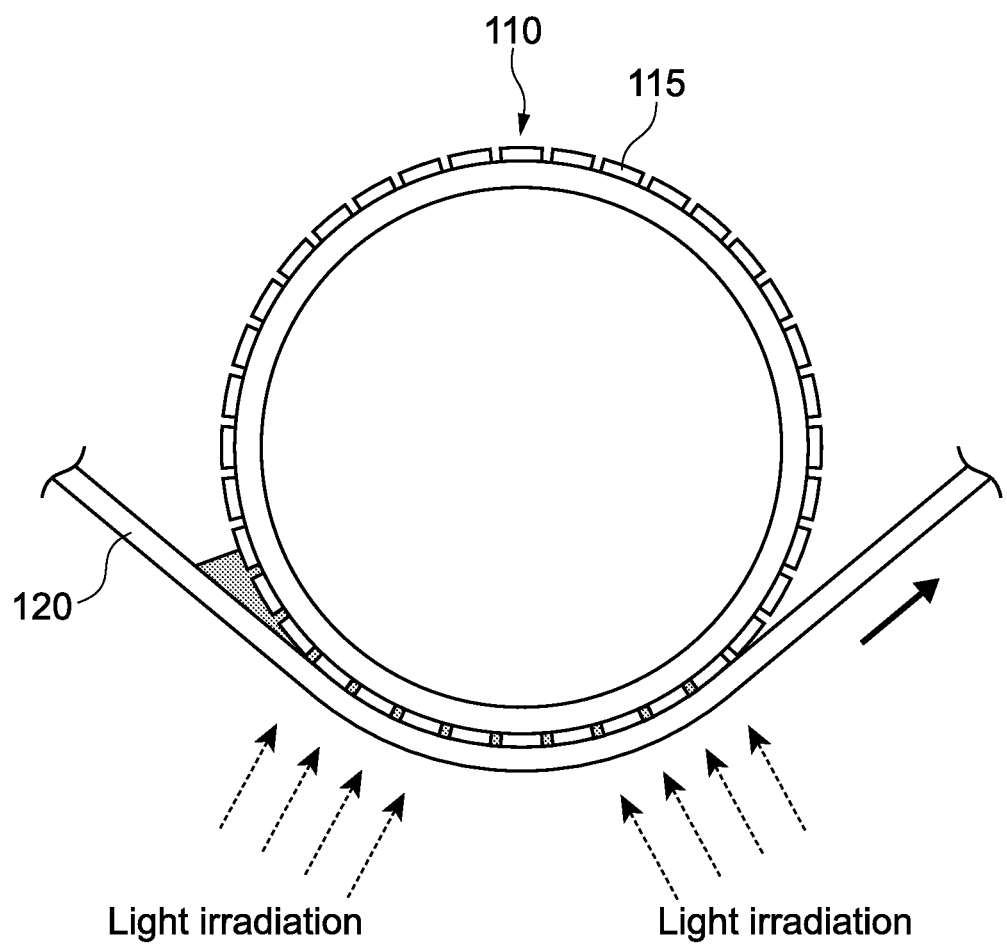
FIG. 7 is a diagram showing a state in which a structure is formed with the use of the three-dimensional mold of the roller shown in FIG. 6.

FIG. 6 is a perspective view showing a roller having a three-dimensional mold used in the imprint technology on the surface 21 as a reference example. On an outer circumferential surface 115 of a roller 110, the three-dimensional mold is formed. For example, in the imprint technology disclosed in Japanese Patent Application Laid-open No. 2011-102039, as shown in FIG. 7, by using such a roller 110, UV curing resin is supplied between the outer circumferential surface 115 and a transferred sheet 120, and the resin is irradiated with UV rays. In this case, a light irradiation area is not a linear shape but a planar shape unlike the present disclosure. This can be clearly understood with reference to FIG. 4 and the like of Japanese Patent Application Laid-open No. 2011-102039.

In the imprint technology as in related art, the three-dimensional mold is used, so releasing from the mold is not easy as described above. The higher the aspect ratio of the structure is, the more remarkably the difficulty appears. In contrast, by the structure forming apparatus 100 according to the above embodiment, such a problem can be overcome.

Figure 8:
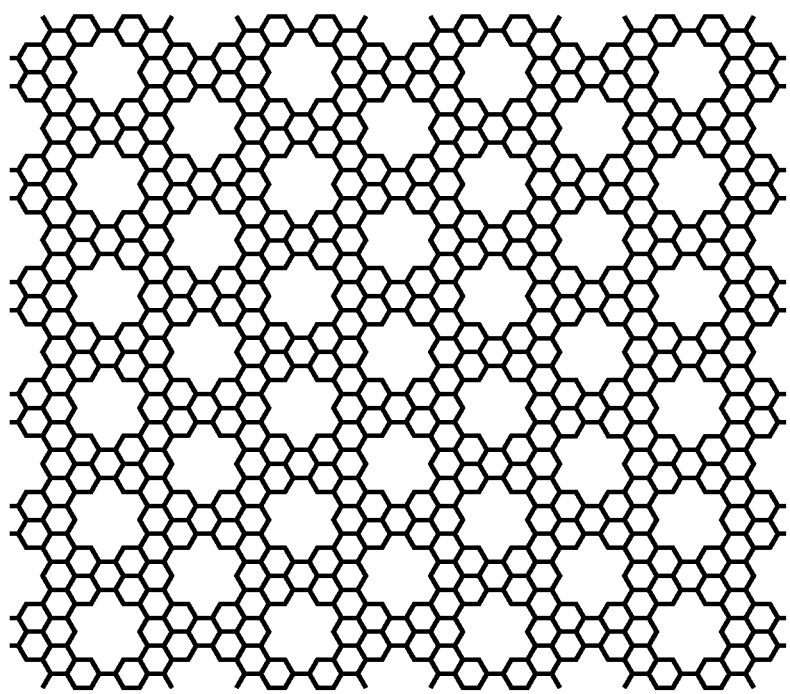
FIG. 8 is a plan view showing another example of the structure according to the first embodiment.

FIG. 8 is a plan view showing another example of the structure. The figure shows a structure having a honeycomb shape of a self-similar form (fractal form). In addition, by the structure forming apparatus 100 according to this embodiment, a structure having an arbitrary pattern, such as an electronic wiring and a micro flow path can be formed.

Second Embodiment

Figure 9:
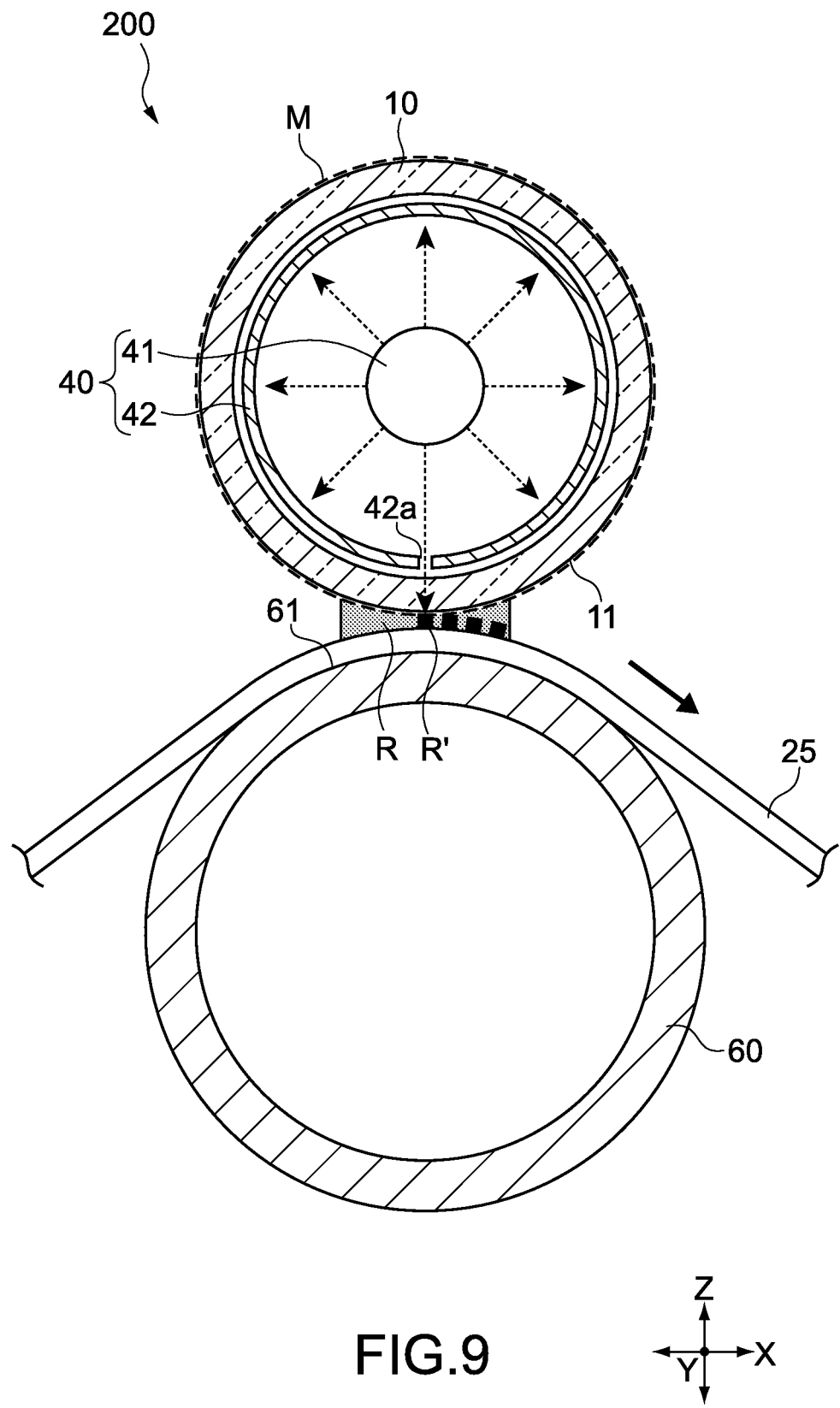
FIG. 9 is a side view showing a structure forming apparatus according to a second embodiment of the present disclosure.

FIG. 9 is a side view showing a structure forming apparatus according to a second embodiment of the present disclosure. In the following description, explanations about parts, functions, and the like that are the same as those included in the structure forming apparatus 100 according to the embodiment described with reference to FIG. 1 and the like will be simplified or omitted, and different points will be mainly described.

A structure forming apparatus 200 is provided with a holding roller 60 serving as a holding member having a curved surface instead of the stage 20 provided with the planar surface 21 as described above. Specifically, between an outer circumferential surface 61, which is the curved surface of the holding roller 60, and the curved outer circumferential surface 11 of the rotary drum 10, the holding area H that holds the material R is formed.

Further, the holding roller 60 according to this embodiment applies tension so that a base film (base material) 25 is brought into contact with the outer circumferential surface 61 and holds the material R with the base film 25 intervened therebetween. The base film 25 is caused to travel at least between a supply reel (not shown) and a winding reel (not shown) in synchronization with the rotary drum 10 and the holding roller 60 while being subjected to back tension. In this case, the supply reel and the winding reel function as traveling mechanisms.

In the structure forming apparatus 100 configured as described above, a structure which is the cured material R' is formed on the base film 25. The winding reel can wind up the base film 25 on which the structure is formed, which can increase the productivity of the structure.

Third Embodiment

FIGS. 10A and 10B are a plan view and a side view of a light irradiation unit of a structure forming apparatus according to a third embodiment of the present disclosure, respectively.

The light irradiation unit is provided with a laser diode 43 that emits laser light as a light source and an optical system 45 that spreads the laser light in a linear form. The optical system 45 includes two cylindrical lenses 451 and 452. Between the laser diode 43 and the optical system 45, a collimator lens 46 is provided.

By the light irradiation unit as described above, it is possible to form linear light along the Y-axis direction. That is, even if the slit member 42 is not provided, it is possible to form a linear light irradiation area in the holding area H.

Further, the light irradiation unit has a size that allows to be disposed in the rotary drum 10, with the result that it is possible to achieve the downsizing of the structure forming apparatus.

Other Embodiments

The present disclosure is not limited to the above embodiments and can have various other embodiments.

In the above embodiments, the mask M is provided on the outer circumferential surface 11 of the rotary drum 10 but may be disposed on an inner circumferential surface of the rotary drum 10.

In the above embodiments, the mask M is provided over the entire outer circumferential surface 11 (360 degrees) of the rotary drum 10 but may be provided on a part of the outer circumferential surface 11. A range thereof is, for example, 30 to 270 degrees but is not limited to this range.

Alternatively, in addition to the mask M, 360-degree provision of the slit member 42 is also unnecessary, and the slit member 42 may be provided partially.

In the above embodiments, as a rotary body, the tubular rotary drum 10 having the curved outer circumferential surface 11 is used. However, the shape of the rotary body is not limited to the tubular shape, only a part of the outer circumferential surface (only at least a part corresponding to the holding area H that holds the material) may be formed into a curved shape. For example, the rotary body may have a shape of a half tube, a ¼ tube, an oval tube, or a shape in combination of those shapes and a polyangular tube. The same holds true for the holding roller 60 having the curved surface according to the second embodiment.

Alternatively, the curved surface may not be formed on the outer circumferential surface of the rotary body. For example, the rotary body may have an outer circumferential surface which is a tubular body having a triangular shape or another polygonal shape, such as a pentagonal shape and a hexagonal shape, and includes a plurality of planes.

In the second embodiment, the base film 25 may not be provided. In other words, to the structure formed in the holding area H, right tension may be directly applied by the holding roller 60. In addition, the structure thus formed may be wound up by the winding reel (not shown).

The light irradiation unit according to the third embodiment is provided with the optical system 45 that spreads the width of laser light in the Y-axis direction. However, the light irradiation unit may have a scanner that performs scan with laser light emitted from the laser light source in the Y-axis direction. In this case, a frequency of reciprocation of the scan only has to be sufficiently faster than the movement of the stage 20 and the rotary drum 10. As the scanner, a polygon scanner, a galvano scanner, or the like can be used.

In the above embodiments, the light irradiation unit is disposed in the rotary drum. However, the light irradiation unit may be partially or entirely disposed outside the rotary drum.

In the above embodiment, UV rays are used as energy lines for curing the material. However, the energy lines may be electron beams, heat, ultrasonic waves, or the like in addition to the UV rays as described above.

Out of the characteristic parts of the above embodiments, two or more characteristic parts can be combined.

It should be noted that the present disclosure can take the following configurations.

(1) A structure forming apparatus, including:
a rotary body on which a mask that is subjected to patterning is capable of being disposed;
an irradiation unit capable of irradiating an area along an axis direction of a rotation of the rotary body with an energy line with the mask intervened therebetween; and
a holding member disposed to be opposed to the rotary body so that a holding area that holds a material cured with the energy line is formed.

(2) The structure forming apparatus according to Item (1), in which
the rotary body has a curved outer circumferential surface to form the holding area between the holding member and the outer circumferential surface.

(3) The structure forming apparatus according to Item (1) or (2), in which
the irradiation unit includes a light source that emits light as the energy line.

(4) The structure forming apparatus according to Item (3), in which
the irradiation unit further includes a slit member having a slit that forms a linear irradiation area on the holding area by causing the light emitted from the light source to pass therethrough.

(5) The structure forming apparatus according to Item (3), in which
the light source is a light source that emits laser light, and
the irradiation unit further includes an optical system that linearly spreads the laser light emitted.

(6) The structure forming apparatus according to any one of Items (3) to (5), in which
the rotary body is a tubular body having a hollow portion in which the light source is disposed.

(7) The structure forming apparatus according to any one of Items (1) to (6), in which
the rotary body has an outer circumferential surface on which the mask is disposed.

(8) The structure forming apparatus according to any one of Items (1) to (6), in which
on a surface of the holding member, at least an area where the holding area is formed is a flat surface.

(9) The structure forming apparatus according to any one of Items (1) to (6), in which
on a surface of the holding member, at least an area where the holding area is formed is a curved surface.

(10) The structure forming apparatus according to Item (9), further including
a traveling mechanism configured to cause a film-shaped base material that holds a structure formed by curing the material to travel,
in which the holding member applies tension to the base material.

(11) The structure forming apparatus according to Item (9) or (10), further including
a winding reel configured to wind up a structure formed by curing the material.

(12) The structure forming apparatus according to any one of Items (1) to (11), in which
in accordance with a distance between the rotary body and the holding member, a thickness of a structure to be formed is determined.

(13) A structure manufacturing method, including:
holding a material that is cured by energy of an energy line between a rotary body on which a mask that is subjected to patterning is capable of being disposed and a holding member disposed to be opposed to the rotary body; and
irradiating an area of the material held which is along an axis direction of a rotation of the rotary body with the energy line through the mask.

(14) A structure manufactured by a method including
holding a material that is cured by energy of an energy line between a rotary body on which a mask that is subjected to patterning is capable of being disposed and a holding member disposed to be opposed to the rotary body, and
irradiating an area of the material held which is along an axis direction of a rotation of the rotary body with the energy line through the mask.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A structure forming apparatus, comprising:
a rotary body that comprises a translucent material;
a plurality of rollers configured to hold the rotary body, wherein the plurality of rollers is in contact with an outer circumferential surface of the rotary body;
a mask on the outer circumferential surface of the rotary body, wherein the mask comprises a plurality of translucent parts;
an irradiation unit configured to irradiate an area along an axis direction of a rotation of the rotary body, wherein the irradiation unit includes:
  a slit member disconnected from the rotary body, wherein the slit member comprises a slit; and
  a light source configured to:
    emit light as an energy line, wherein the energy line is configured to pass through the mask via the rotary body; and
    change a light emission quantity of the emitted light based on a rotation speed of the rotary body, and
  the irradiation unit is further configured to control the light source to one of:
    turn on emission of the light at a first timing at which a translucent part of the plurality of translucent parts of the mask faces the slit, or
    control an amount of the emitted light to increase the light emission quantity at the first timing at which the translucent part of the plurality of translucent parts of the mask faces the slit;
  a holding member opposite to the rotary body, wherein the holding member is configured to:
    hold a resin material in a holding area; and
    move in a direction perpendicular to the axis direction of the rotation of the rotary body, wherein
      the movement of the holding member is by one of a ball screw mechanism or a linear motor,
      the resin material is curable by the emitted light,
      a thickness of a structure to be formed is based on a distance between the rotary body and the holding member, and
      the distance is adjustable.

2. The structure forming apparatus according to claim 1, wherein
  the outer circumferential surface of the rotary body is a curved surface, and
  the holding area is between the holding member and the outer circumferential surface of the rotary body.

3. The structure forming apparatus according to claim 1, wherein a linear irradiation area on the holding area corresponds to a position of the slit aligned with the translucent part of the plurality of translucent parts.

4. The structure forming apparatus according to claim 1, wherein
  the rotary body is a tubular body that comprises a hollow portion, and
  the light source is in the hollow portion of the tubular body.

5. The structure forming apparatus according to claim 1, wherein at least an area on a surface of the holding member is flat.

6. The structure forming apparatus according to claim 1, wherein the mask further comprises a plurality of light shielding parts.

7. The structure forming apparatus according to claim 1, wherein
  the mask is two-dimensional, and
  the mask covers an entire portion of the outer circumferential surface of the rotary body.

8. The structure forming apparatus according to claim 1, further comprising a driving unit configured to rotate the rotary body in synchronization with the movement of the holding member.

9. The structure forming apparatus according to claim 1, wherein the light source, the slit member, and the rotary body are concentric.

10. The structure forming apparatus according to claim 1, wherein the movement of the holding member is at a constant speed.

11. The structure forming apparatus according to claim 1, wherein each of the slit member and the slit is elongated in the axis direction of the rotation of the rotary body.

12. The structure forming apparatus according to claim 1, wherein the light source is elongated in the axis direction of the rotation of the rotary body.

13. The structure forming apparatus according to claim 1, wherein
  the mask covers a part of the outer circumferential surface of the rotary body.

14. The structure forming apparatus according to claim 1, wherein
  the mask further comprises a plurality of light shielding parts,
  the slit faces the translucent part of the plurality of translucent parts of the mask at the first timing,
  the slit faces a light shielding part of the plurality of light shielding parts of the mask at a second timing different from the first timing, and
  the light emission quantity of the emitted light is higher at the first timing as compared to the light emission quantity at the second timing.

* * * * *